Nov. 23, 1954     H. T. YATES ET AL     2,695,052
SAFETY TETHER FOR CHILD OCCUPANTS OF AUTOMOBILE SEATS
Filed March 26, 1952

INVENTORS
*Harold T. Yates* and
*Wilbert I. Yates*

BY *Mason, Fenwick & Lawrence*
ATTORNEYS

United States Patent Office 2,695,052
Patented Nov. 23, 1954

2,695,052

SAFETY TETHER FOR CHILD OCCUPANTS OF AUTOMOBILE SEATS

Harold T. Yates, Alexandria, Va., and Wilbert I. Yates, College Park, Md.

Application March 26, 1952, Serial No. 278,542

7 Claims. (Cl. 155—189)

This invention relates to a safety tether for child occupants of an automobile. Its general object is to provide a tether which will allow the child a range of body movement laterally of the seat as well as forwardly, but limit such movements to the extent necessary to prevent the child from falling through an open door or being thrown forwardly against the back of the front seat, or the instrument panel, as the case may be.

More specifically, it is an object of the invention to provide track means extending across the forward face of the back of the seat which the child occupies, secured at its ends, a traveler on the track means, and a leash connecting the traveler to body harness on the child.

A further object of the invention is the provision of a safety tether as described, including means for varying the scope of lateral movement of the traveler.

Still another object of the invention is to provide a safety tether as described, including a protective band or shield between the track means and the face of the seat back, across which said track means extends.

Other objects of the invention will appear as the following description of a practical embodiment thereof proceeds.

In the drawing which accompanies and forms a part of the following specification, and throughout the figures of which the same reference characters have been used to denote identical parts:

Figure 1:
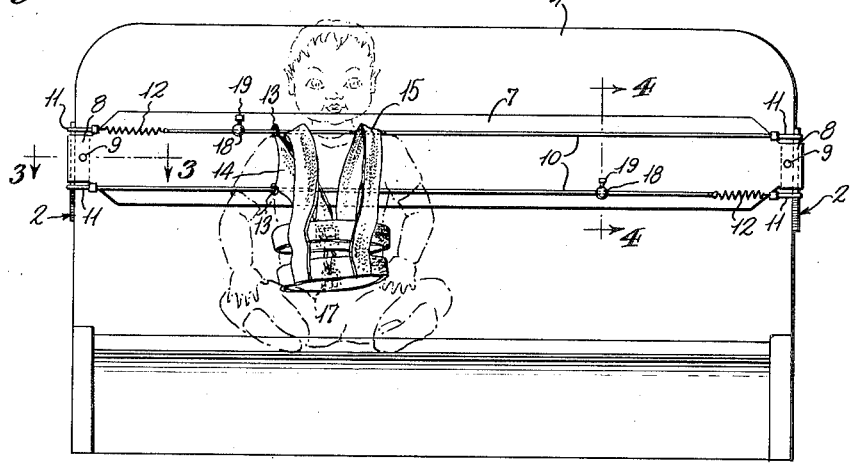
Figure 1 is a front elevation of an automobile seat equipped with the safety tether embodying the principles of the present invention.
Figure 2:
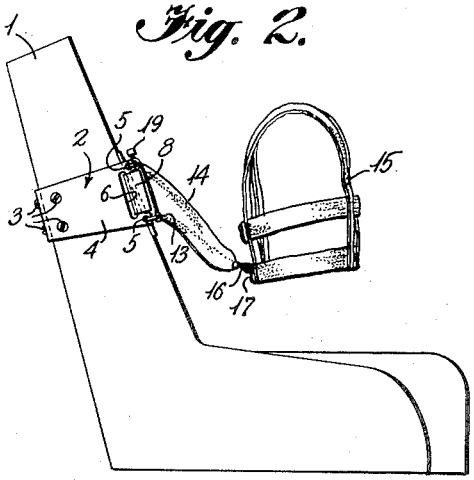
Figure 2 is a side elevation.
Figure 3:
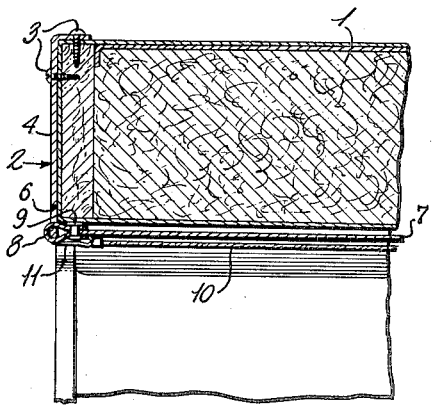
Figure 3 is a section taken along the line 3—3 of Figure 1.
Figure 4:
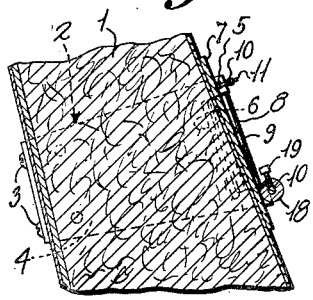
Figure 4 is a section taken along the line 4—4 of Figure 1.

Referring now in detail to the several figures, the numeral 1 represents the seat of an automobile wide enough for two or more passengers. The safety tether is secured so as to extend transversely across the front face of the back of the seat. In the illustrative embodiment, the tether includes a pair of similar brackets 2, preferably of metal, one at each side, secured to the seat back by means such as the screws 3. Alternatively, the brackets can be secured to the body of the automobile at points opposite the sides of the seat back.

The brackets 2 are similar, each having a bar 4 and eyes 5 at the forward end, and a slot 6 at the front of said bar. The eyes 5 are preferably approximately in the plane of the front face of the seat back, and spaced apart.

A flexible band 7 extends between the brackets 2, adapted to lie against the front face of the seat back. It is of uniform width through the major portion of its length, and wider than the space between the eyes 5. It is tapered at the ends to form tongues 8 which fold about the bars 4, forming securing loops which are fastened by snap buttons 9. The snap buttons are preferably concealed behind the extended portion of the strap, where they are inaccessible to the child.

Track means are provided which, as shown, comprise a pair of wires 10, having snap hooks 11 at the ends. The wires are stretched in spaced parallel relation between the brackets 2, the snap hooks of the upper wire engaging the respective upper eyes of the brackets, while the snap hooks of the lower wire engage the corresponding lower eyes. The wires overlie the wide portion of the band 7 in close relation thereto. Each wire includes a stiff spring 12 at one end to properly tension the wire when secured between the brackets, and for the sake of symmetry the springs are respectively at the opposite ends of the wires. The function of the band 7 is to protect the upholstery from abrasive contact by the wires or the traveler that slides thereupon.

Said traveler, in the embodiment shown, consists of two rings 13 strung upon the respective wires, of considerably larger diameter than the wires so as to freely travel thereupon, said rings being attached in spaced relation to the end of a leash 14, the latter being secured at its opposite end to a body harness 15, worn by the child. The use of two wires as track means for the traveler not only provides a double factor of safety in case of breakage, but the spaced relationship of the wires maintains the rings 13 at a large angle with respect to the wires, permitting them to run more freely than a single ring which would assume a canted position flat against the wire.

The body harness is preferably buckled at the back so that the child cannot release itself from the harness, and the leash may be conveniently coupled to the body harness by a snap hook 16, engageable with one of the buckles 17.

The safety tether, as described, gives the child a lateral range of body movement equal to the full width of the seat. The length of the leash should ordinarily be such as to keep the child on the seat, although it may be desirable to make it long enough to permit the child to stand on the floor in front of the seat. In any event, it should be sufficiently short to protect the child from being thrown against the back of the front seat, or against the instrument panel, as the case may be, according to whether the child occupies the rear or front seat of the automobile.

If the latch of the automobile door is within reach of the child, it may be desirable to restrict the lateral movement so that the child will not be able to fall into the door opening if the door should become opened. For this purpose, a pair of beads 18 are provided, one strung upon each wire, one to the right and the other to the left of the traveler, slidable along said wires and sufficiently large not to pass through the rings 13. Each of said beads has a transverse thumb screw 19, the inner end of which can be clamped against the wire to fix the respective beads adjustably with respect to the ends of the seat.

While we have in the above description disclosed what we believe to be a practical embodiment of the invention, it will be understood by those skilled in the art that the specific elements are entitled to a full range of equivalents and that the specific details of construction and arrangement of parts, as shown, are by way of example and not to be construed as limiting the scope of the invention.

What we claim is:

1. Safety tether for child occupants of automobile seats, comprising in combination, a pair of brackets adapted to be secured at the opposite sides of the back of an automobile seat, track means extending between said brackets having the ends thereof secured to said brackets, said track means including a wire and a tensioning spring between one end of said wire and the adjacent bracket, and a traveler slidable along said wire including coupling means adapting it to be attached to a body harness.

2. Safety tether as claimed in claim 1, including stops slidable upon said wire between said traveler and said brackets, and means for longitudinally adjusting the positions of said stops upon said wire for varying the range of sliding movement of said traveler.

3. Safety tether for child occupants of automobile seats, comprising in combination, a pair of brackets adapted to be secured at the opposite sides of the back of an automobile seat, track means extending between said brackets having the ends thereof secured to said brackets, an upholstery protective band extending between said brackets and secured at its ends thereto, said band being wider than said track means and overlain by the latter in an intermediate longitudinal zone, and a traveler slidable along said track means including coupling means adapting it to be attached to a body harness.

4. Safety tether as claimed in claim 3, said brackets being slotted to receive looped end portions of said upholstery protective band.

5. Safety tether as claimed in claim 3, said track means including a wire and a tensioning spring between one end of said wire and the adjacent bracket.

6. Safety tether as claimed in claim 3, including stops slidable upon said track means between said traveler and said brackets, and means for longitudinally adjusting the positions of said stops upon said track means for varying the range of sliding movement of said traveler.

7. Safety tether for child occupants of automobile seats, comprising a pair of brackets adapted to be secured to the opposite sides of the back of an automobile seat, spaced parallel flexible track means extending between said brackets secured at their ends thereto, and an upholstery protective band underlying said track means and of such width as to extend widthwise beyond said track means, said upholstery protective band being secured to its ends to said brackets, and a flexible elongated traveler having spaced eyes at one end freely surrounding the respective track means to ride longitudinally thereupon, and coupling means at the opposite end of said traveler adapting it to be fastened to body harness worn by the child.

References Cited in the file of this patent

UNITED STATES PATENTS

| Number | Name | Date |
|---|---|---|
| 1,712,198 | Clapp | May 7, 1929 |
| 1,848,313 | Buresh | Mar. 8, 1932 |
| 2,212,746 | Nunn | Aug. 27, 1940 |
| 2,626,447 | Hunt | Jan. 27, 1953 |

FOREIGN PATENTS

| Number | Country | Date |
|---|---|---|
| 26,079 | Great Britain | Nov. 11, 1909 |
| 515,818 | Great Britain | Dec. 14, 1939 |